United States Patent [19]
Cushing et al.

[11] 3,743,431
[45] July 3, 1973

[54] RADIATION SENSITIVE MEANS FOR DETECTING FLAWS IN GLASS

[75] Inventors: Charles J. Cushing, Churchville; Kurt C. Schwind; Richard D. Vander Neut, both of Philadelphia, all of Pa.

[73] Assignee: Philco-Ford Corporation, Philadelphia, Pa.

[22] Filed: May 9, 1972

[21] Appl. No.: 251,832

[52] U.S. Cl. .......................... 356/239, 250/219 DF
[51] Int. Cl. ......................................... G01n 21/32
[58] Field of Search .................. 350/6, 162 SF, 285; 250/219 DF; 356/120, 167, 200, 209, 210, 237

[56] References Cited
UNITED STATES PATENTS

| | | | |
|---|---|---|---|
| 3,245,306 | 4/1966 | Potter et al. | 356/209 |
| 3,565,568 | 2/1971 | Hock | 356/209 |
| 3,338,130 | 8/1967 | Gaffard | 356/200 |

*Primary Examiner*—William L. Sikes
*Attorney*—Robert D. Sanborn and Harry W. Hargis

[57] ABSTRACT

Apparatus for detecting flaws in a continuously moving ribbon of float-formed glass, comprising optical elements constructed and arranged to direct scanning beams of light through the glass ribbon, and which, in combination with associated discriminating means, afford a system which detects discrepancies in the transmission of light in the region of a flaw contained in the glass. In addition to the optical elements, the apparatus comprises a flaw marking unit and a control unit. Information as to the exact nature (e.g. wave, ream, bubble, and viscous lump) and location of marked flaws in the inspected glass may be stored in a computer, in the order of severity of the flaw.

9 Claims, 16 Drawing Figures

FIG. 10. (OUTPUT OF WAVE CHANNEL OPTICS SHOWING REINFORCEMENT OF WAVE TYPE DEFECTS)

FIG. 11. (OUTPUT OF REAM CHANNEL OPTICS SHOWING FREQUENCY REDUCTION OF WAVE TYPE DEFECTS)

RADIATION SENSITIVE MEANS FOR DETECTING FLAWS IN GLASS

CROSS REFERENCE TO RELATED DISCLOSURE

The present application discloses improvements in apparatus for detecting flaws in transparent material, which flaws are defined as Metal Flaws and Optical Flaws, and includes claims directed only to that portion of the apparatus relating to the detection of Metal Flaws. Our copending disclosure, Ser. No. 251,833, filed May 9, 1972, and assigned to the assignee of the present application, both discloses and claims the apparatus relating to detection of Optical Flaws.

BACKGROUND OF THE INVENTION

This invention relates to apparatus for detecting flaws in transparent material, and more particularly to improved optical means and flaw-identifying means for use in such apparatus.

While of broader applicability, the invention has particular utility in the inspection of sheet glass manufactured by the float process.

Prior art apparatus for inspecting glass and other transparent materials has been somewhat limited in capability for accurate detection, identification, and recording of information concerning flaws, and it is a general objective of the present invention to provide improved apparatus overcoming such limitations.

A flaw, or defect, in a sheet of glass is considered to be any abnormality within or on the surface of the glass sheet, which interferes with the normal transmission of light. Flaws fall into two general categories, known as Metal Flaws and Optical Flaws, and the present invention is directed to detection of Metal Flaws which are defined as either foreign inclusions in the glass or disruption of the surface of the glass.

As a further refinement of the aforementioned categories, metal flaws may be divided into subcategories comprising "bubbles" and "viscous lumps." A bubble is a gaseous inclusion, whereas a viscous lump is a disruption in the surface of float-formed glass.

Optical flaws, the detection of which is dealt with in our above-identified copending application Ser. No. 251,833 are divided into subcategories comprising "wave" and "ream." A wave is an undulation occurring repetitively on the surface of float glass, extending in a direction generally parallel to the direction of the glass flow. A ream is a narrow band within the glass which has an effective refractive index different from the surrounding material, and extending generally parallel to the direction of glass flows.

Other conditions which present optical characteristics to the scanner that are similar to any of the above discussed types of flaws may be classified as one or more of those flaws.

It is a specific objective of this invention to provide improved glass inspection apparatus capable of both distinguishing between and recording flaws comprising bubbles and viscous lumps.

A further and more specific objective of the invention is the provision of improved electrical circuitry, in combination with optical scanning means, to achieve identification of bubbles and viscous lumps in glass.

SUMMARY OF THE INVENTION

In achievement of the foregoing as well as other objectives, the invention contemplates provision, in combination with means for continuously moving a ribbon of glass along a float line, of optical means associated therewith operable continuously to scan the width of the ribbon of glass, in detection of flaws or imperfections. A processing circuit means coupled with the optical means is effective, upon detection of a flaw of predetermined shape and size, to determine the location, type, and severity of the flaw, and to transmit this information instantly to control circuit means. The control circuit means is operable to activate one of a plurality of ink marking guns, mounted directly over the moving ribbon of glass, visually to mark the glass in the region of the flaw. The marking gun system is described in detail, and claimed, in other disclosures identified below.

It is a feature of the invention that simultaneously with detection and marking of a flaw, information relating to the flaw may be automatically stored in suitable computer memory bank means, for later print-out, and that the marked defective regions are readily observable, when the ribbon of glass is cut to desired shape and size. These marked regions then may be diverted as reusable scrap, for subsequent return to the glass melt.

An overall apparatus in accordance with our invention includes both a metal flaw and an optical flaw detection system. The appended claims are directed to the detection of metal flaws, and the objectives therefore contemplate improvements in apparatus of that kind.

The manner in which the objectives and advantages of the invention may best be achieved will be more fully understood from a consideration of the following description taken in light of the accompanying drawing.

DESCRIPTION OF THE PREFERRED EMBODIMENT

Figure 1:
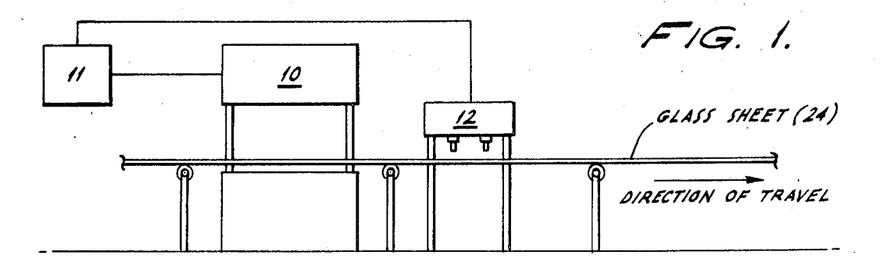
FIG. 1 is a diagrammatic showing, in elevation, of the general organization of glass flaw detection and marking apparatus embodying the invention.

With more detailed reference to the drawing, it will be appreciated from FIG. 1 that apparatus embodying the invention includes an Optical Scanning Unit 10, a Gun Marking Unit 12, and a Control Console Unit 11. By way of example, the above apparatus may comprise one of four modules, each capable of scanning a section of float glass 32 inches wide, so that with four such modules, a ribbon of glass 128 inches wide can be inspected continuously as it is moved along a predetermined path.

Each optical scanning unit 10 includes elements disposed above and below the glass undergoing inspection and comprises both a Metal Flaw Subsystem, contemplated by the present invention, and a Ream and Wave Flaw Subsystem to which our identified copending application is directed. The Metal Flaw Subsystem is operable to detect localized flaws or defects such as bubbles and viscous lumps, and its optical system, which is shown schematically in FIG. 2, includes a point light source 13, for example a quartz-iodide lamp, arranged to direct a beam of light through a condensing lens 14, and through a source aperture 15 effective to provide a beam having a rectangular cross section. The rectangularly sectioned beam is then reflected by mirrors 16, 17, and 18, and in the process of being reflected is demagnified and focused by a series of lenses 21, 22 and 23 onto the glass sheet 24 undergoing inspection. Before arriving at lens 23, the center of the defocused beam of light is interrupted by a small plate provided with a dark detector mirror 25 on its far side relative to the direction of beam travel from source 13. Disposition of mirror 25 in the path of the beam reflected by mirror 17 onto mirror 18 results in a beam cross section, reflected by mirror 18, having the general shape shown in full lines in FIG. 2A. When the rectangular beam reflected by mirror 18 is focused in the plane of the glass 24 (FIG. 2B), a rectangular spot results, with the larger dimension extending along the line of movement of the glass sheet.

Figures 2, 2A, 2B:
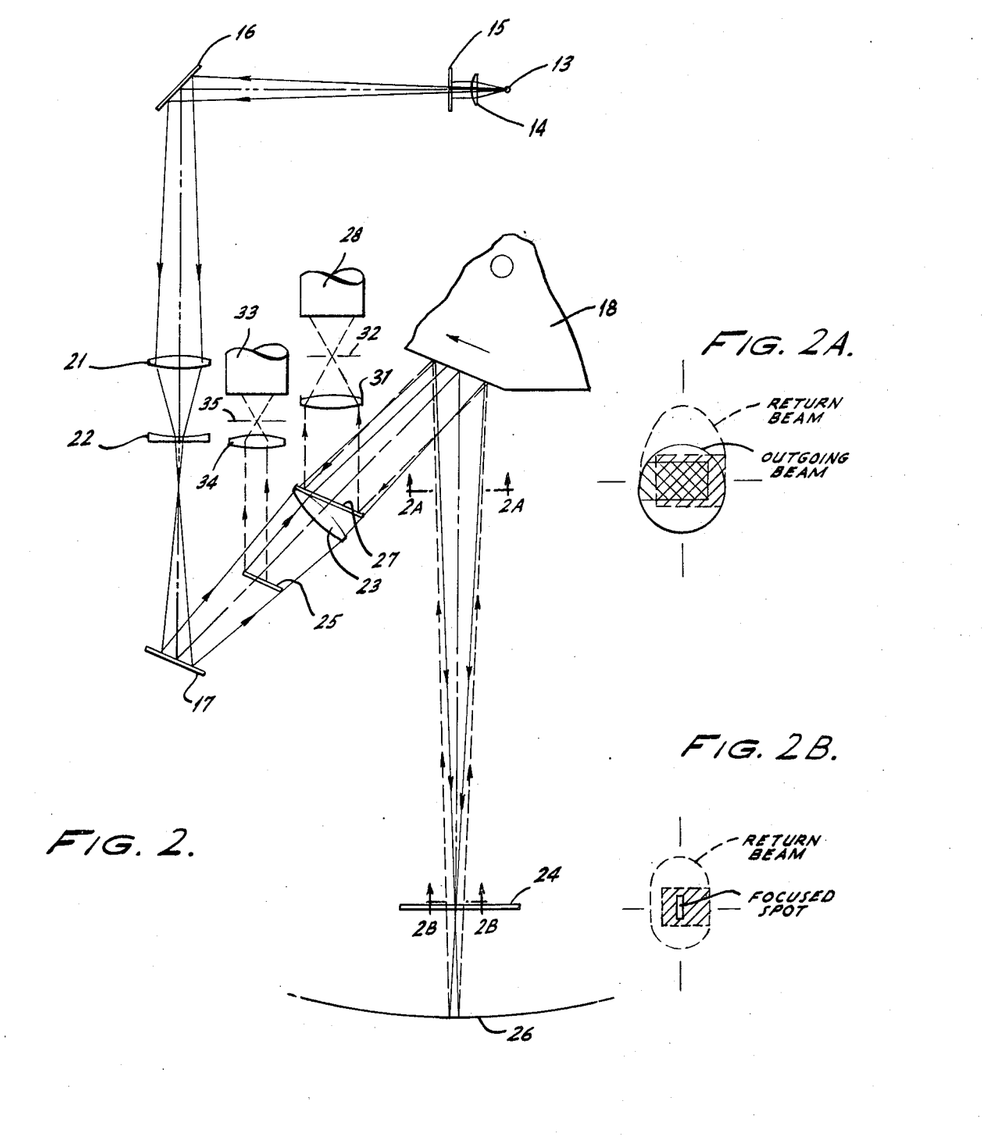
FIG. 2 is a diagrammatic showing of the metal flaw detection optical system embodied in apparatus seen in FIG. 1.
FIG. 2A is a sectional showing of a light beam, taken in the plane indicated by arrows 2A—2A applied to FIG. 2.
FIG. 2B is a sectional showing of a light beam, taken in the plane indicated by arrows 2B—2B applied to FIG. 2.

As the rectangular beam of light passes through glass 24, it defocuses and strikes the underlying cylindrical mirror 26, from which it is reflected back (see the broken-line oval around FIG. 2B) through the glass along essentially the same path from which it came. Cylindrical mirror 26 has its axis of curvature extending in the direction of travel of the glass 24. Importantly, mirror 18 is hexagonal and is mounted for rotation about its central axis which extends parallel to the axis of curvature of mirror 26. The facets of hexagonal mirror 18 are set substantially for rotation through the center of curvature of cylindrical mirror 26, but out of parallel with the axial extent of the latter, by an angle of about 1/2°, so that the beam of light reflected by cylindrical mirror 26 passes back through glass 24 with a cross-section as shown in FIG. 2B. The returning beam of light is reflected by a facet of hexagonal mirror 18, back onto both lens 23 and the half silvered light detector mirror 27 disposed above the lens. The portion of the beam of light striking mirror 27 is reflected thereby into the light channel detector or photomultiplier tube 28 via a lens 31 and aperture 32 that minimizes stray light.

The dark center cone of the returning beam of light reflected by hexagonal mirror 18 passes through lens 23 and is reflected by the dark detector mirror 25 onto the dark channel detector or photomultiplier tube 33 via a lens 34 and aperture 25.

In operation of the metal flaw subsystem to discriminate between defects such as bubbles and viscous lumps, mirror 18 is rotated at a predetermined r.p.m. to sweep the focused beam of light across glass 24, which is moved at speeds in the range of from 130 to 900 inches per minute, for reflection along the length of underlying cylindrical mirror 26. In the event the focused beam is interrupted by a bubble-type defect in glass 24, the divergence of the return beam, as reflected by mirror 26, is increased, resulting in a light loss in the portion of the beam arriving at the light channel detector 28, accompanied by no increase in light in the portion of the return beam arriving at the dark channel detector 33. It is further recognized that should a viscous lump in glass 24 interrupt the beam, the lump tends to distort and scatter the beam, resulting in a loss of light in the portion of the return beam arriving at the light channel detector 28, accompanied by an increase in light in the portion of the return beam arriving at the dark channel detector 33. Accordingly, we have devised logic circuitry whereby viscous lamp defects can be differentiated from bubble defects, which circuitry shows whether or not there is coincidence between defects appearing in the dark channel and the light channel detectors 33 and 28. Further to enhance sensitivity of the detection apparatus, the dark channel photodetector 33 is positioned sufficiently far into the dark zone, by controlling the divergence of the beam, so as substantially to eliminate any response in the dark channel due to bubbles.

Figure 3:
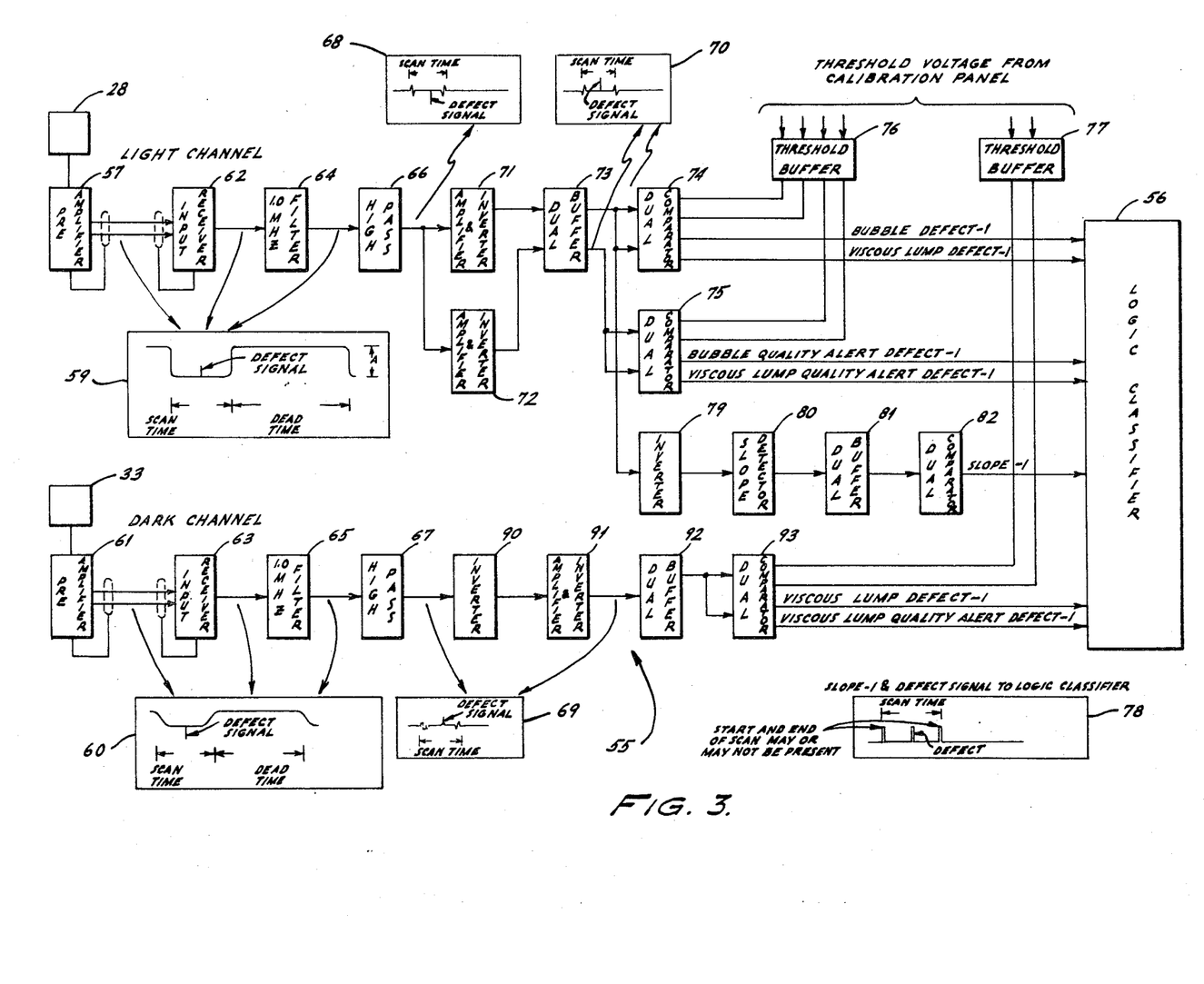
FIG. 3 is a schematic showing of processing circuitry for the metal flaw optical system seen in FIG. 2.

Apparatus included in control console unit 11 for processing this information, and for signalling the gun marking unit 12, will now be described in connection with FIGS. 3 and 4. FIG. 3 illustrates the processing circuitry for the light and the dark channel signals as generated by the metal flaws. As will be understood from this figure, discrimination is obtained for two categories of observed metal flaws (bubbles and viscous lumps), at two severity levels (rejectable and quality control alert). Flaw discrimination is achieved through use of the light channel detector 28 and dark channel detector 33 shown in FIG. 2, in conjunction with wave shaping circuitry 55 and logic circuitry 56 shown in FIG. 3.

With more detailed reference to FIG. 3, the signals from light and dark channel detectors 28 and 33 are amplified by their respective pre-amplifiers 57 and 61, and are interfaced to input receivers and buffers 62 and 63. The respective input signal waveforms and expected amplitudes are shown at 59 and 60.

The purpose of the input receivers and buffers 62 and 63 is to amplify and isolate the input signals and produce signals corresponding to the information observed by the detectors 28 and 33. Signals in the light and dark channels then pass through their respective 1.0 MHz low pass filters 64 and 65 to remove high frequency noise. The resultant signals are then processed through 25.0 kHz high pass amplifiers 66 and 67, removing the low frequency resulting from the scan rate of the optics. The output waveforms are shown at 68 and 69.

The metal flaw light channel is then divided into subchannels, each with an independent amplitude adjustment, including amplifiers and inverters 71, 72 followed by a dual buffer 73, and dual comparators 74, 75. A threshold level applied by the threshold buffer 76 to the dual comparator stage 74 in one subchannel is at the necessary level to allow thresholding of reject bubble and viscous lump flaw defects, while the threshold level applied to the dual comparator stage 75 in the other subchannel allows thresholding of quality alert bubble and viscous lump flaw detects. The threshold level adjustments applied to dual comparators 74 and 75 are accomplished by means of external adjustment potentiometers located on the calibration panel of unit 11.

A third subchannel, using information processed by the reject flaw (i.e., bubble and viscous lump defect) subchannel, consists of an invertoer 79, slope detector 80, buffer 81, and dual comparator 82. Slope detector 80 limits frequencies below 35 kHz and amplifies all higher frequencies. Thus, dual comparator 82 in this subchannel produces an output 78 only for the higher frequency reject information, which is then used in conjunction with logic classifier 56 to inhibit all low frequency information which may be processed through the reject subchannel.

The remaining portion of the dark channel contains an inverter 90, an amplifier and inverter 91, a dual buffer 92 and a dual comparator 93. Amplitude adjustment for the dark metal channel is provided on the amplifier and inverter board 91. The threshold level applied by threshold buffer 77 to dual comparator 93 in the dark channel allows thresholding of viscous lump type flaws.

Figure 4:
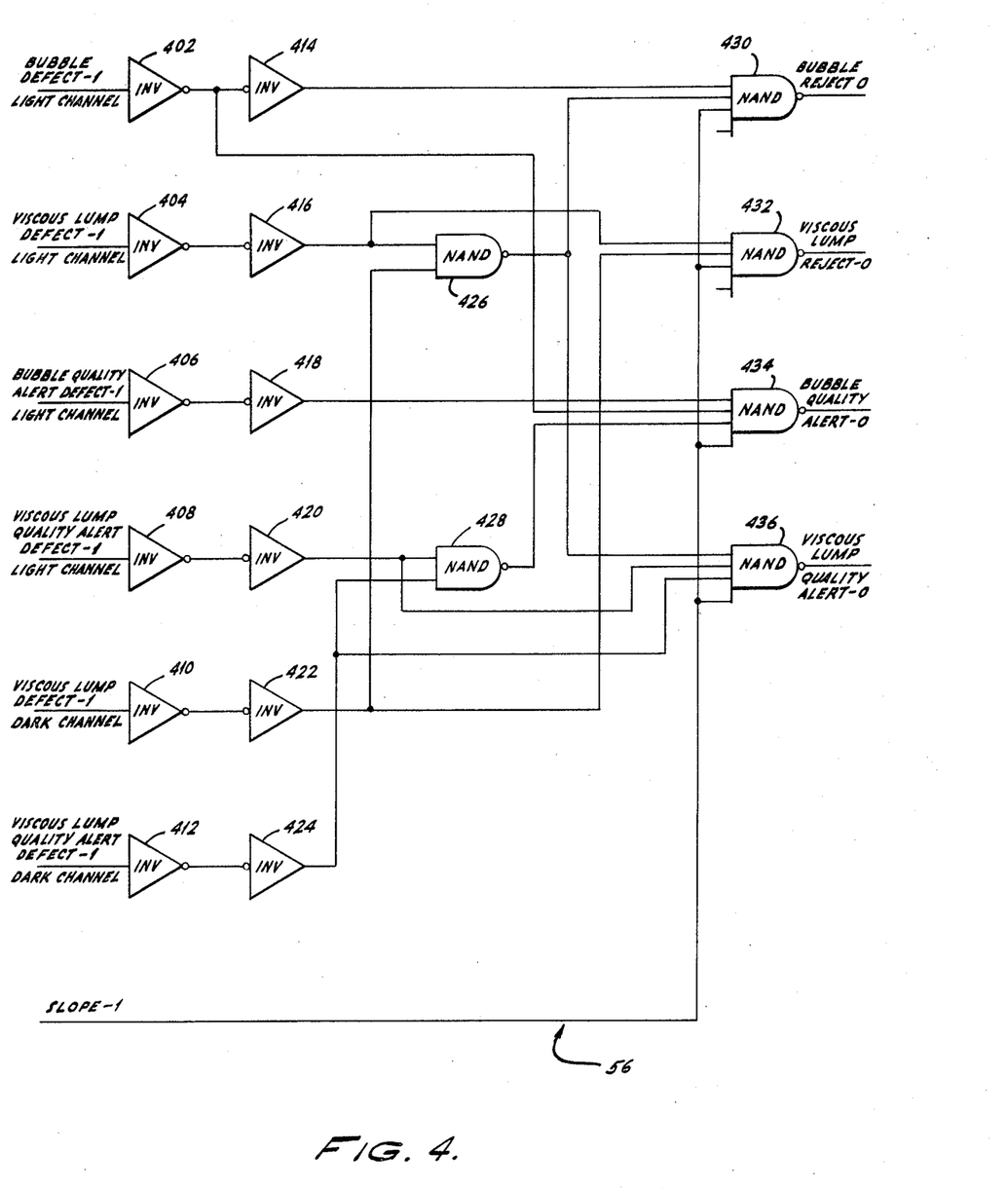
FIG. 4 is a schematic showing of thelogic classifier shown in block form in FIG. 3.

Further, and with reference also to FIG. 4, the viscous outputs from comparators 74, 75, 82 and 93 in the metal flaw and optical flaw channels of the analog section 55 (FIG. 3) are applied to digital logic gates of the logic classifier 56. In operation, whenever all logic requirements are satisfied, an output pulse is generated and fed from classifier 56 to marking unit 12.

From what follows, it will be appreciated that the logic circuits contemplated by the present invention provide, in effect, an inhibit circuit for bubble defect signals when light transmitted through a viscous lump defect is received at the dark channel photomultiplier 33.

In particular accordance with this invention the logic circuit illustrated in detail in FIG. 4 comprises twelve inverters evenly numbered 402 through 424 and six NAND gates evenly numbered 426 to 436. These inverters and NAND gates are well known components, such as are used in computers, and are commercially available. Briefly stated, an inverter is a digital stage which produces a low voltage in its output for a high voltage at its input. Inverters are often used as buffers to isolate the input from the output by connecting two of them in cascade, thus restoring the original sense of the signal. A NAND gate is a device which will produce a low voltage at its output only when there is a high voltage at each of its inputs.

The logic circuit illustrated in FIG. 4 operates in the following manner. When there is an indication in any of the input channels of a detected signal by a corresponding photodetector 28 or 33 there will be a high voltage, or one (1), at the logic circuit input terminal. Alternatively, when there is no signal from a photodetector, there will be a low voltage, or zero, at the input terminal. The logic operates to produce high voltages, or ones, in its output when there is no reject. When there is a reject, that output terminal corresponding to that type of reject becomes a low voltage or a zero.

A discussion of the pulses generated at each of the NAND gates 430, 432 and 436, together with requirements for generating each pulse, is set forth in what follows.

BUBBLE REJECT

Symbol 430 is a three-input NAND gate that produces a low voltage, or zero, at its output when a bubble reject is detected. The one, and only, condition for this output is when there is a high voltage at each of its three inputs. The inputs of NAND gate 430 are connected respectively to inverter 414, NAND gate 426, and the slope input. Inverter 414 produces a one at its output when there is a zero at its input. Since the input of inverter 414 is connected to the output of inverter 402, there will only be a zero at this common connection when there is a one fed from the light channel to the input of 402 upon indication by photodetector 28 of a bubble defect.

It is a feature of the invention that NAND gate 426 is an inhibitor, and will produce a zero at its output when, and only when, there is a one at each of its inputs. This occurs when there are indications both by photodetector 28 in the viscous lump defect light channel at inverter 404, and by photodetector 33 in the viscous lump defect dark channel at inverter 410. When this indication occurs, the output of NAND gate 426 becomes a zero, which prevents the NAND gate 430 from operating falsely to produce a bubble reject pulse. Therefore, there will be a bubble reject indication at the logic output when, and only when, there is a bubble defect indication entering inverter 402, and when there is no viscous lump defect either in light channel inverter 404 or in the dark channel inverter 410. Although a bubble defect may show up as an indication in the bubble defect light channel, as well as in the viscous lump defect light channel, it is unlikely that it will also show up as a viscous lump defect in the dark channel. Therefore the bubble defect will appear as a bubble reject pulse on the output of NAND gate 430.

VISCOUS LUMP REJECT

A viscous lump reject of a severity sufficient to appear in the viscous lump defect light channel will also show up as an indication in the viscous lump defect dark channel, so that signals will appear at the inputs of both inverters 404 and 410. This indication, in turn, will be translated to high outputs of inverters 416 and 422, producing a one at each of the inputs of the NAND gate 426, which in turn will operate NAND gate 426 to produce a zero in its output. This zero at the output of NAND gate 426 will turn off NAND gate 430, and therefore serve to inhibit any bubble reject indication. A zero will also appear at the input of NAND gate 436, and also inhibit the viscous lump quality alert indication. Thus, if a viscous lump is severe enough to operate the defect channels, the logic will automatically turn off the less severe quality alert viscous lump channel, permitting a pulse to be generated only by the viscous lump defect NAND gate 432.

BUBBLE QUALITY ALERT

The bubble quality alert pulse requires that an indication be received by NAND gate 434 from the outputs of inverter 402, inverter 418 and NAND gate 428. The function of NAND gate 428 is to inhibit a bubble quality alert pulse whenever there is a viscous lump quality alert which causes an indication to appear in the viscous lump quality alert defect light channel inverter 408 and viscous lump quality alert defect dark channel inverter 412. Thus, in the same manner that NAND gate 426 inhibits a bubble reject pulse for a strong defect in the viscous lump channels, NAND gate 428 inhibits the bubble quality alert pulse for a viscous lump indication in the less severe quality alert channels. A connection from the output of inverter 402 to one of the inputs of NAND gate 434 prevents the NAND gate 434 from giving an output bubble quality alert pulse if the bubble defect is severe enough to register in the bubble defect channel 402.

VISCOUS LUMP QUALITY ALERT

A viscous lump quality alert will produce signals in both the inverters 409 and 412 but will not be strong enough to produce signals in the inverters 404 and 410. Therefore there will be a one in each of the outputs of NAND gate 426, and inverters 420, 424. This will produce a zero in the output of NAND gate 436 thus generating a viscous lump quality alert pulse.

Summarizing, a bubble reject pulse will be generated at 430 when there is a bubble defect indication, but no viscous lump defect, in the light and dark channels. A viscous lump reject pulse will be generated at 432 when there is a viscous lump defect indication in both the light channel and the dark channel. A bubble quality alert pulse will be generated at 434 if there is a bubble quality alert signal, but no bubble defect signal and no viscous lump quality alert indication in either the light channel or the dark channel. A viscous lump quality alert pulse will be generated at 436 if there is no viscous lump defect signal in the light and dark channel, and there is a viscous lump quality alert signal in both the light and dark channels.

Moreover, all the NAND gates 430 through 436 will register an output indication only if there is an indication from the Slope channel. This assures that defects will only be registered for signals which can represent, for example, edges of the ribbon of glass, changes in light illumination, and the like which would generate slow changes in input indications at the light and dark photodetectors.

Figure 5:
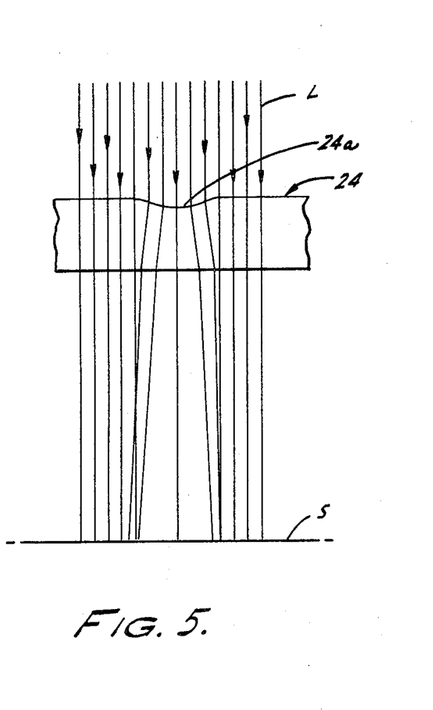
FIG. 5 is an enlarged sectional view of a light beam passing through a wave defect in the glass.
Figure 6:
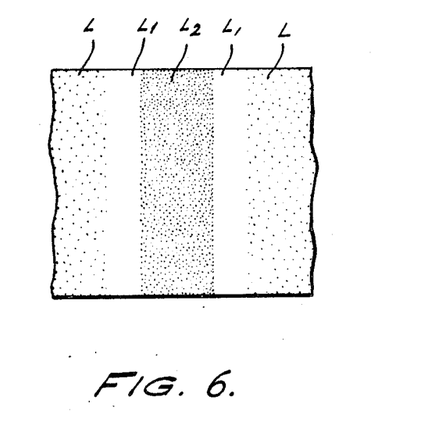
FIG. 6 is a sectional showing of the light beam as it would appear in the plane indicated by the letter S applied to FIG. 5.

Since the Wave and Ream Subsystem forms an essential part of our overall apparatus, attention will now be turned to that subsystem which is however claimed in a copending disclosure. Referring to FIGS. 5 and 6, wave defect identification will be more fully understood by recognizing that light normally incident on a sheet of glass 24 and passing therethrough will obey Snells Law. If there is a change in glass thickness, with a corresponding radius of curvature as is seen at 24a, FIG. 5, the paths of the individual light rays L will be altered at the transition points of the glass thickness changes. If the altered light rays are projected onto a screen S, the apparent cross section of the beam will contain alternating light and dark bars L-1 and L-2 as seen in FIG. 6.

Figure 7:
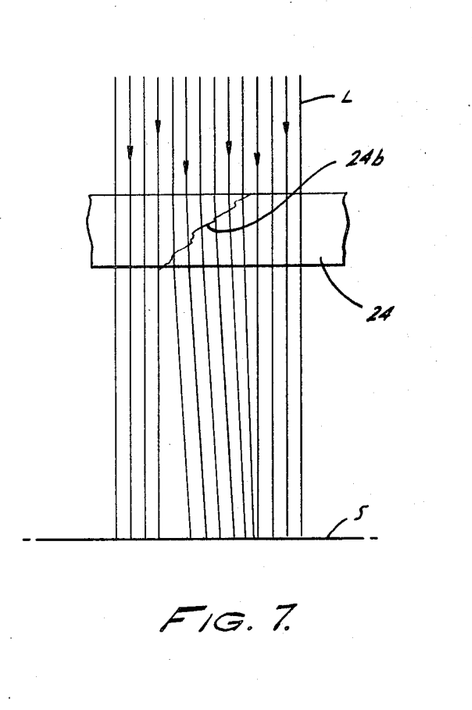
FIGS. 7 and 8 are views similar to FIGS. 5 and 6, respectively, but illustrating the light passing through a ream defect.
Figure 8:
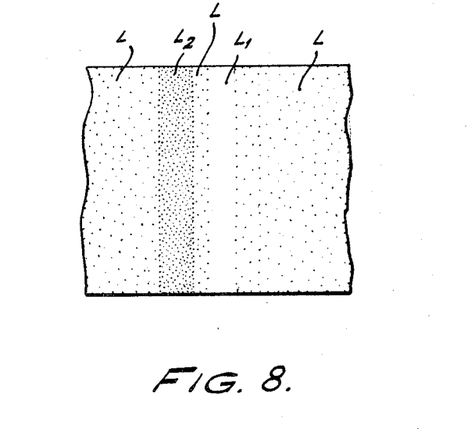

Similarly, and with reference to FIGS. 7 and 8, ream defects 24b will change the index of refraction of the glass 24 so that the paths of the light rays L will be altered as seen in FIG. 7. The apparent cross section, as viewed on screen S according to the illustration in FIG. 8, will include corresponding light and dark bars L-1, L-2, but of lesser width than the bars seen in FIG. 6. The ream and wave optics to be described below readily detect the above described optical flaws.

Figures 9, 9A:
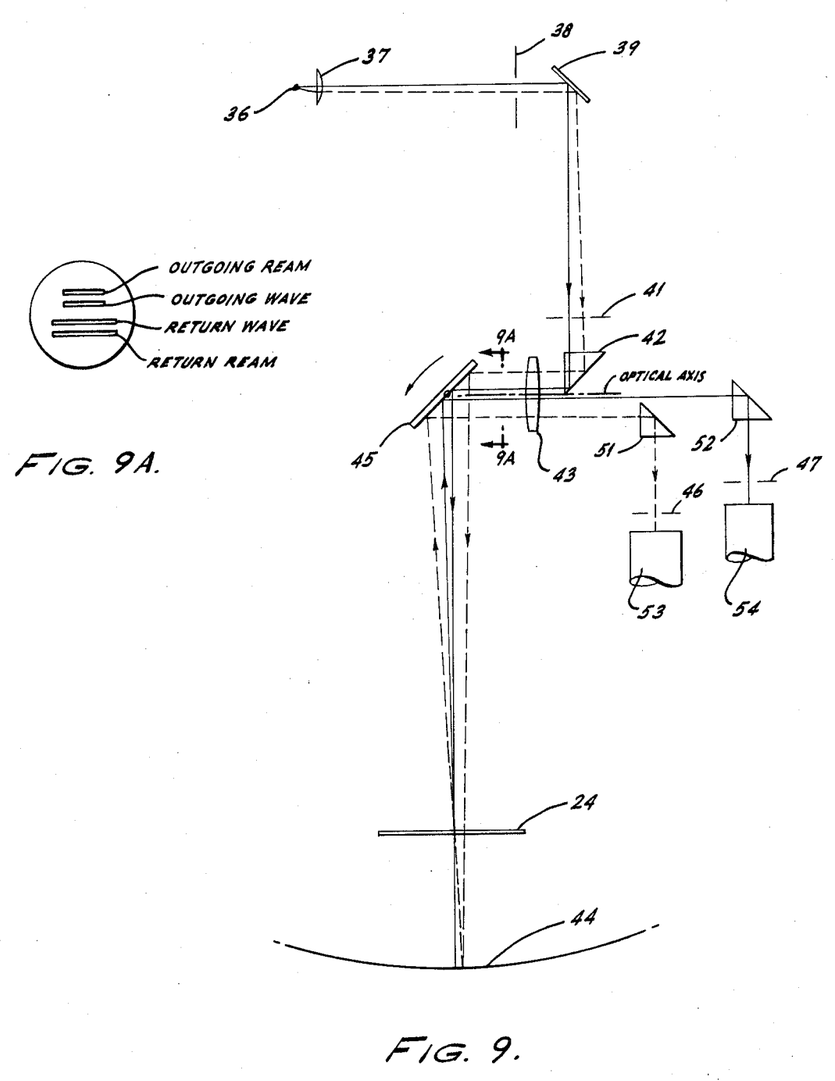
FIG. 9 is a diagrammatic showing of the ream and wave detection optical system which is also embodied in apparatus seen in FIG. 1.
FIG. 9A is a sectional showing of a light beam taken in the plane indicated by arrows 9A—9A applied to FIG. 9.

The Ream and Wave Subsystem is operable to detect the above described optical flaw defects, which are oriented generally parallel to the direction of glass flow and persist for distances that may extend several feet. With reference to FIG. 9, light emanating from a source 36, such as a quartz-iodide lamp, is directed through a condensing lens 37, and the resultant beam of light passes through a light stop aperture 38 to be reflected by a mirror 39. The beam reflected by mirror 39 is interrupted by double-slit aperture 41 to form two narrow beams of light. These two narrow beams are then reflected by prism 42 to pass through lens 43 for reflection by a single-facet rotating mirror 45 through glass 24, onto cylindrical mirror 44. Rotating mirror 45 is located at the center of curvature of cylindrical mirror 44, and its axis of rotation lies on and is normal to the optical axis of lens 43.

Figure 10:
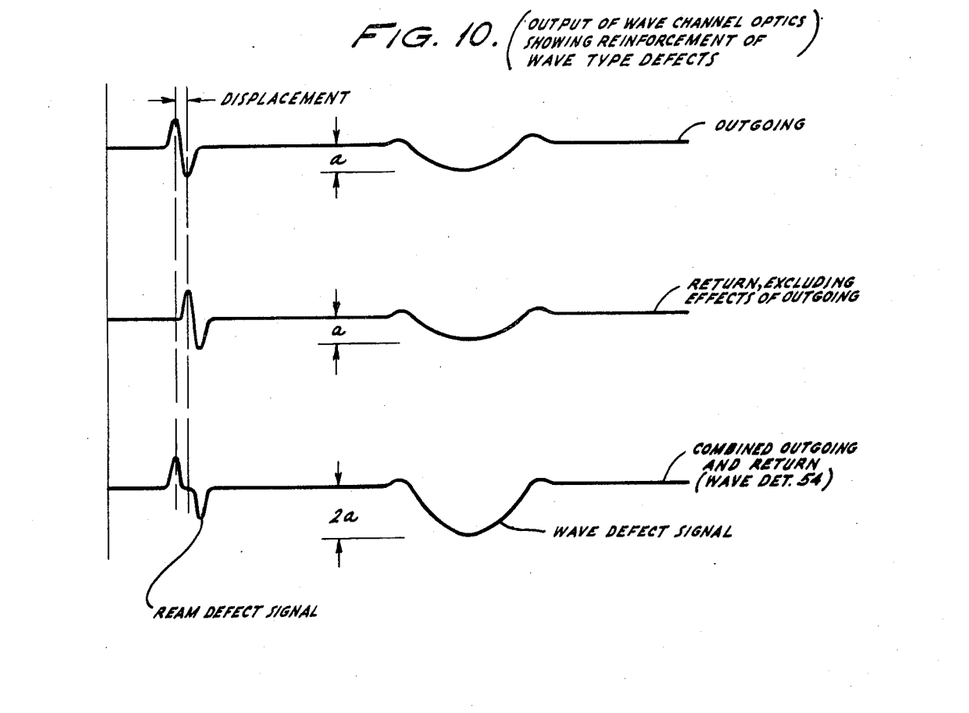
FIG. 10 is a diagrammatic illustration of the output of wave channel optics showing reinforcement of wave type defects.
Figure 11:
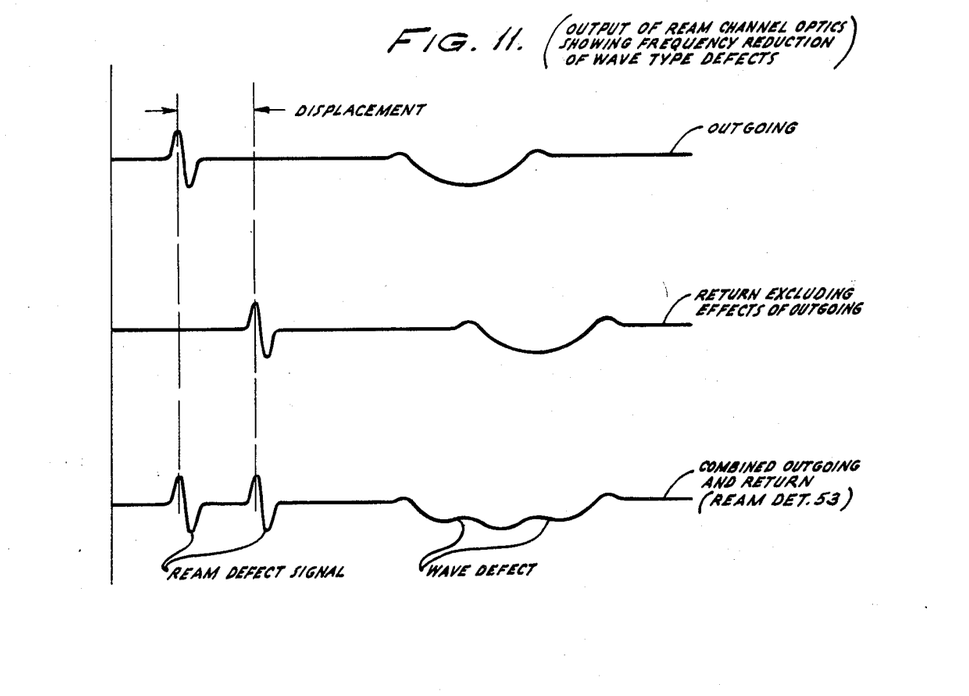
FIG. 11 is an illustration similar to FIG. 10, but showing the output of the ream channel optics showing frequency increase of ream type defects.

Since the two outgoing beams are located to one side of the optical axis with respect to rotating mirror 45 and lens 43, the return beams fall to the opposite side of the optical axis, as seen in FIG. 9A, and are directed onto slotted apertures 46 and 47, via a pair of prisms 51 and 52, respectively, for impingement on respective ream and wave detectors 53 and 54. The principal difference in the ream and wave channels are the locations of the beams as they strike glass 24. The wave channel beam (solid line) is close to the center line of the optical system so that both the outgoing and return beams pass through the defect at substantially the same instant, thus reinforcing the relatively low frequency signal, as will be seen in FIG. 10. The ream channel beam (broken line) is farther from the optical axis so that either the outgoing or the return beam passes through the defect at a given instant. Thus a pair of distinct high frequency signals are generated by each ream defect, as will be seen in FIG. 11.

The frequency of a defect signal has been shown to be related to the identity of the defect, so that the wave and ream signals will fall within specific frequency ranges. If scanned with identical optical systems there would be an overlap in the ream and wave signal frequencies. The apparatus contemplated herein advantageously affords the ability to optically increase the frequency separation between the wave and ream signals, so that a distinct separation (FIG. 12) in frequency ranges is obtained. With two specific but different frequency ranges obtained from the defects, a bandpass filtering technique is used for defect discrimination.

Figures 12, 13:
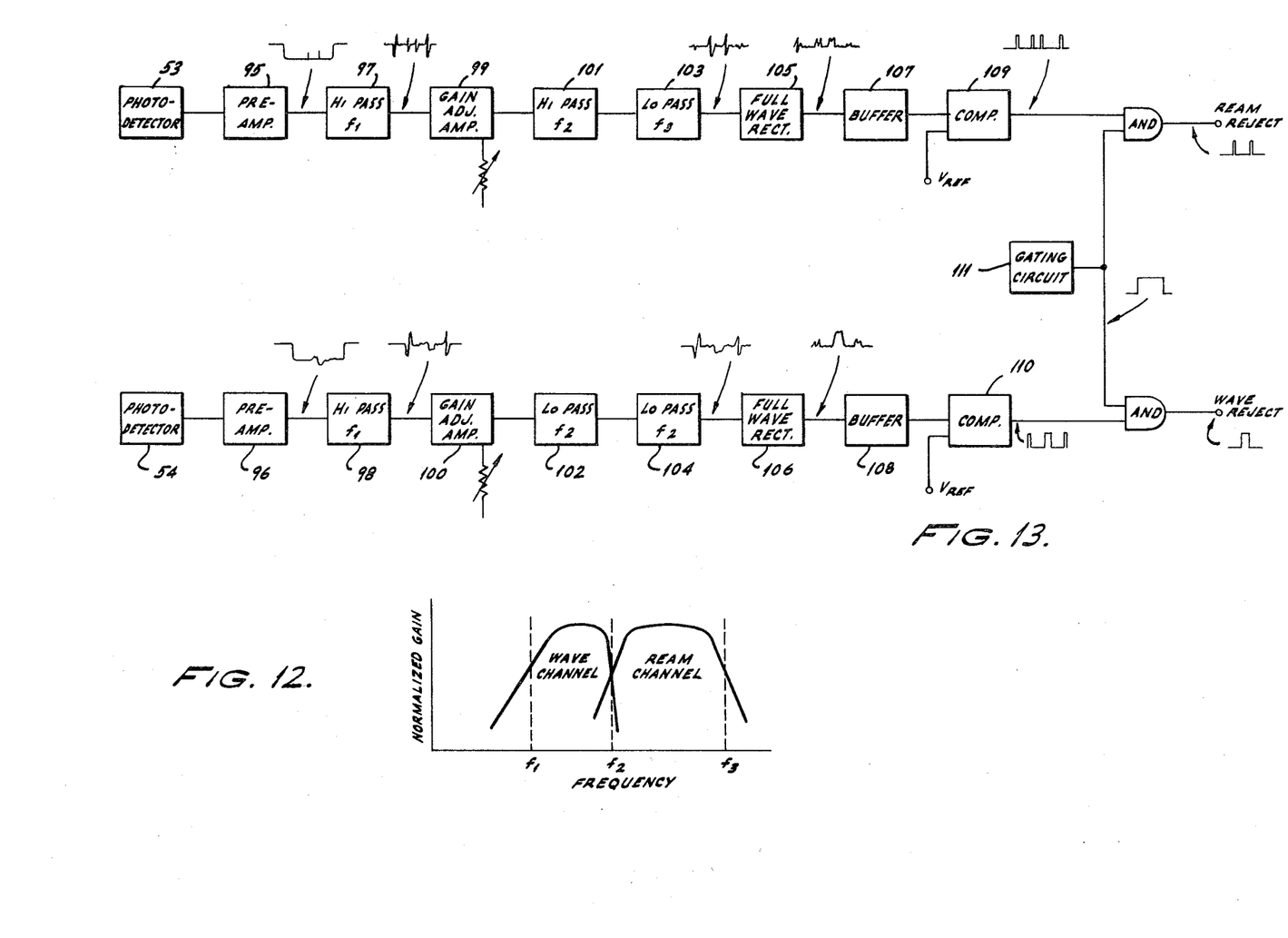
FIG. 12 is a diagrammatic showing of the ream and wave signal frequency ranges.
FIG. 13 is a schematic showing of a ream and wave signal processing circuit.

FIG. 13 illustrates circuitry employed to discriminate between the wave and ream defects. Light energy is converted to electrical energy in the photodetectors 53 and 54. Preamplifier gain stage 95 and 96 are used to obtain good signal to noise ratio, and the signals then are applied, respectively, to a pair of high pass amplifiers 97 and 98 which are used to eliminate the D.C. levels of the scan signals. This is followed by a pair of channel gain adjustment amplifiers 99 and 100. Bandpass amplifiers 101 and 104 are then used to pass desired frequencies. Full wave rectifiers 105 and 106 are used to provide single polarity outputs from either polarity input, and buffers 107 and 108 are used for impedance matching. The signals are then applied to comparator circuits 109 and 110. Thresholding is obtained from fixed reference voltage levels (V ref), and the outputs are then in digital form for feeding to marking unit 12.

Logic type gating 111 is usually employed to monitor a specific portion of the total scan signal, thereby to eliminate any false indications from the ringing signal at the beginning and end of scan signals.

Automatic marking means 12 may be of a number of known types, one of which is disclosed in U. S. Pat. No. 3,445,672, dated May 20, 1969, and assigned to the assignee of the present invention. A preferred marking system is disclosed in the copending application of Charles J. Cushing and Kurt C. Schwind, Ser. No. 257,845, filed May 30, 1972, and assgined to the assignee of the present invention. Briefly, the latter system comprises a set of primary marking guns, a set of backup marking guns, a glass scanner for monitoring marking by the primary marking guns, and means for activating a backup marking gun in the event a primary gun has failed to mark on command.

We claim:

1. In apparatus of the type which detects flaws in glass having substantially planar surfaces, which flaws are, characteristically, either of a first, light-refracting type, or a second, light-scattering type, and which apparatus comprises: means for passing a beam of light from a source through said glass; and means for forming a pair of images of said glass intercepted by said beam, one image being formed to have a dark field and the other image being formed to have a light field, a flaw of the first type being effective to decrease the quantity of light in said other image and not to increase the quantity of light in said one image, a flaw of the second type being effective to decrease the quantity of light in said other image and to increase the quantity of light in said one image; the improvements which comprise means for directing said one image on a first photosensitive element, means for directing said other image on a second photosensitive element; and means for processing signals derived from said photosensitive elements to identify a flaw as to type, and including means effective to inhibit the signal provided by said second photosensitive element when images arising from a flaw of said second type are directed onto said photosensitive elements.

2. Apparatus according to claim 1, and characterized in that said means effective to inhibit the signal comprises control means operable in response to signals derived from said first photosensitive element effectively to block signals derived from said second photosensitive element, when signals are generated by said first photosensitive element.

3. Apparatus according to claim 2 and further characterized in that said control means comprises: switch means; means providing a connection between the output of said second photosensitive element and an output terminal; means providing a connection from the output of said first photosensitive element to said switch means to operate the latter, said switch means upon operation being effective to prevent signals from said second photosensitive element from reaching said output terminal when there are signals generated by both said first photosensitive element.

4. Apparatus according to claim 1, and characterized in that said last recited means comprises: means arranged to supply predetermined voltages at each of a first, second, and third terminal if the amplitude of an input pulse exceeds a predetrmined threshold; means arranged to supply predetermined voltage at a fourth terminal in correspondence with the slope of an input pulse with predetermined fixed limits; first, second, and third pairs of series connected inverters each pair connected to one of said first, second, and third terminals, respectively; a two-input NAND gate; first and second three-input NAND gates; means connecting the first input terminal of said two-input NAND gate to a first input terminal of said second three-input NAND gate and to the output terminal of said second pair of inverters; means connecting the second input terminal of said two-input NAND gate to the output terminal of said third pair of inverters and to the second input terminal of said second three-input NAND gate; means connecting the output terminal of said two-input NAND gate to the second input terminal of said first three-input NAND gate; means connecting the output terminal of said first pair of inverters to said first input terminal of said first NAND gate; and means connecting said fourth terminal to the third input terminals of each of said first and second three-input NAND gates.

5. Apparatus according to claim 4, and further characterized in that said two-input NAND gate in functioning as an inhibitor, is operable to produce a zero at its output terminal, when there is a one at each of its input terminals, and wherein an input voltage pulse arriving at said second and third terminals, as indications of a flaw of said second type, produce such a one at each input terminal of said two input NAND gate and as a result produce a zero at its output terminal, so that said first three-input NAND gate is prevented from operating to produce a zero at its output as a false indication of a defect of said first type.

6. Apparatus according to claim 5, and characterized further by the provision for connection to the output terminals of said first and second three-input NAND gates means operable to mark said glass in the region of a detected flaw, in response to a pulse received at a corresponding, last recited, output terminal.

7. Apparatus according to claim 4 wherein said last recited means as characterized therein further comprises: means arranged to supply predetermined voltages at each of a fifth, sixth, and seventh terminal if the amplitude of an input pulse to each exceeds a predetermined threshold; fourth, fifth and sixth pairs of series connected inverters, each pair connected to one of said fifth, sixth, and seventh terminals, respectively; a second two-input NAND gate; first and second four-input NAND gates; means connecting a first input terminal of said first four-input NAND gate to the output terminal of said fourth pair of series connected inverters; means connecting a second input terminal of said first four-input NAND gate to the output terminal of the first inverter of said first pair of series connected inverters; means connecting a third input terminal of said first four-input NAND gate to the output of said second NAND gate; means connecting the output terminal of said first two-input NAND gate to the first input terminal of said second four-input NAND gate; means connecting the first input terminal of said second two-input NAND gate to the second input terminal of said second four-input NAND gate; means connecting the third input terminal of said second four-input NAND gate to the second input terminal of said second two-input NAND gate; means connecting the fourth input terminals of each of said first and second four-input gates to said fourth terminal; means connecting thee output terminal of said fifth pair of inverters to the first input terminal of said second two-input NAND gate; and means connecting the output terminal of said sixth pair of inverters to the second input terminal of said second two-input NAND gate.

8. Improved apparatus for detecting defects in glass having substantially planar surfaces, which defects are of a pair of types characterized generally as bubbles and viscous lumps, the former tending to refract and the latter tending to scatter transmitted light, which improved apparatus comprises: a source of light; lens means for focusing light from said source onto said glass; stop means interposed between said source of light and said lens means for partially stopping said lens means to outgoing light; first reflective means positioned closely adjacent the plane of the principal focus of said lens means for reflecting the light pattern established by said stop means onto said lens means in substantially one-to-one area correspondence; first photosensitive means; means for transmitting portions of the reflected light pattern passing through stopped regions of said lens means to said first photosensitive means; second photosensitive means; partially light transmissive light reflective means positioned between said lens means and its point of focus and effective to transmit light and to direct unstopped portions of the reflected light pattern onto said second photosensitive means, interruption of the focused beam of light by a bubble defect being effective to defocus the beam and to increase the divergence of the return beam so that a light loss occurs at said second photosensitive means, with no increase in light at the first photosensitive means, and interruption of the focussed beam of light by a viscous lump defect being effective to scatter the return beam so that there is a loss of light at the second photosensitive means and an increase in light at the first photosensitive means; and said improved apparatus being characterized by the inclusion of means for processing signals derived from said first and second photosensitive means to identify a defect as to type, said means for processing comprising means effective to inhibit the signal derived from said second photosensitive means when said focused beam is scattered upon encountering a viscous lump defect, whereby to ensure derivation of a signal only from said first photosensitive means indicative of a viscous lump defect.

9. In apparatus of the type which detects flaws in glass having substantially planar surfaces, which flaws are characteristically of a first, light refracting type, or of a second, light scattering type, and which apparatus comprises: means for directing a beam of light from a source through said glass; and means for forming images of said glass intercepted by said beam, one image being formed to have a dark field and the other image being formed to have a light field, the presence of a flaw of the light refracting type being effective to decrease the quantity of light in said other image and not to increase the quantity of light in said one image, a flaw of the light scattering type being effective to decrease the quantity of light in said other image and to increase the quantity of light in said one image; the improvements which comprise first and second photosensitive elements, means for directing said one image on said first photosensitive element, means for directing said other image on a second photosensitive element, and means for inhibiting the signal derived at said second photosensitive element arising when an image is received thereon due to the presence of a flaw of the light scattering type, whereby a signal indicative of a flaw of the light refractive type is prevented when a flaw of a light scattering type is present.

* * * * *

UNITED STATES PATENT OFFICE
CERTIFICATE OF CORRECTION

PO-1050 (5/69)

Patent No. 3743431      Dated July 3, 1973

Inventor(s) Charles J. Cushing et al.

It is certified that error appears in the above-identified patent and that said Letters Patent are hereby corrected as shown below:

Column 4, line 13, "25" should read --35--; and line 34,

"lamp" should read --lump--.

Column 5, line 24, "invertoer" should read --inverter--.

Column 7, line 28, "409" should read --408--; and line 51, after "represent" the phrase:

--defects and not signals which can represent-- should be inserted.

Column 10, line 4, "both" should be deleted.

Signed and sealed this 20th day of November 1973.

(SEAL)
Attest:

EDWARD M. FLETCHER, JR.
Attesting Officer

RENE D. TEGTMEYER
Acting Commissioner of Patents